(12) United States Patent
Yu et al.

(10) Patent No.: US 11,850,664 B2
(45) Date of Patent: Dec. 26, 2023

(54) SILICIFIED MODIFIED ZERO-VALENT IRON AND ITS PREPARATION METHOD AND APPLICATION

(71) Applicant: CHINESE RESEARCH ACADEMY OF ENVIRONMENTAL SCIENCES, Beijing (CN)

(72) Inventors: Minda Yu, Beijing (CN); Mingxia Zheng, Beijing (CN); Beidou Xi, Beijing (CN); Jing Su, Beijing (CN); Yuanyuan Sun, Beijing (CN); Xiaosong He, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 29 days.

(21) Appl. No.: 17/451,151

(22) Filed: Oct. 15, 2021

(65) Prior Publication Data
US 2022/0118516 A1   Apr. 21, 2022

(30) Foreign Application Priority Data

Oct. 16, 2020 (CN) ............ 202011112107.7
Oct. 16, 2020 (CN) ............ 202011112108.1

(51) Int. Cl.
*B22F 9/24*   (2006.01)
*B22F 9/04*   (2006.01)
(Continued)

(52) U.S. Cl.
CPC ............ *B22F 9/24* (2013.01); *B22F 9/04* (2013.01); *C02F 1/705* (2013.01);
(Continued)

(58) Field of Classification Search
CPC ......... C02F 1/00; C02F 1/58; C02F 1/62–64; C02F 1/70; C02F 1/705; C02F 2305/08;
(Continued)

(56) References Cited

U.S. PATENT DOCUMENTS 10,512,957 B2 *  12/2019  Thoreson ............. B09C 1/08

FOREIGN PATENT DOCUMENTS

CN   106830622 A  *  6/2017  ............ C02F 11/00
CN   108911101 A  *  11/2018  ............ C02F 1/705
(Continued)

OTHER PUBLICATIONS

Han et al, "Remediation of trichloroethylene-contaminated groundwater by three modifier-coated microscale zero-valent iron," 2016. Environ Sci Pollut Res, vol. 23, pp. 14442-14450. (Year: 2016).*
(Continued)

*Primary Examiner* — Brian D Walck
*Assistant Examiner* — Nazmun Nahar Shams
(74) *Attorney, Agent, or Firm* — Seed IP Law Group LLP

(57) ABSTRACT

A silicified modified zero-valent iron, whose surface layer is a silicon-containing oxide layer formed by silicate, which is obtained by the following method: dissolved silicate and micron iron powder are used as raw materials and mixed in proportion, and ball milling under an inert gas atmosphere to obtain the silicified modified zero-valent iron. The invention also discloses the application of silicified modified zero-valent iron in repairing polluted water bodies. The invention uses green silicate as silicon source to carry out surface silicification modification of micron zero-valent iron, which has simple operation, low cost and is convenient for large-scale production. Moreover, the prepared silicified zero-valent iron has good dispersibility, high reduction activity and strong recycling performance, and can be used for the treatment of various polluted water bodies and soil.

3 Claims, 3 Drawing Sheets

(51) Int. Cl.
*C02F 1/70* (2023.01)
*C02F 101/34* (2006.01)

(52) U.S. Cl.
CPC ..... *B22F 2009/043* (2013.01); *B22F 2201/10* (2013.01); *B22F 2301/35* (2013.01); *C02F 2101/345* (2013.01)

(58) Field of Classification Search
CPC ... B22F 9/04; B22F 9/18–28; B22F 2009/043
See application file for complete search history.

(56) References Cited

FOREIGN PATENT DOCUMENTS

| CN | 109304470 A | * | 2/2019 | ............. | B22D 11/06 |
| CN | 110606538 A | * | 12/2019 | ................ | C02F 1/70 |

OTHER PUBLICATIONS

Gu et al, "Mechanochemically Sulfidated Microscale Zero Valent Iron: Pathways, Kinetics, Mechanism, and Efficiency of Trichloroethylene Dechlorination," 2017. Environmental Science & Technology, vol. 51, pp. 12653-12662. (Year: 2017).*
Cui et al, "Concentration-Dependent Enhancing Effect of Dissolved Silicate on the Oxidative Degradation of Sulfamethazine by Zero-Valent Iron under Aerobic Conditions," 2020. Environmental Science & Technology, vol. 54, pp. 1242-1249. (Year: 2019).*

* cited by examiner

SILICIFIED MODIFIED ZERO-VALENT IRON AND ITS PREPARATION METHOD AND APPLICATION

BACKGROUND

With the rapid development of industry and agriculture, the global water pollution of heavy metals and non-degradable organic matter is becoming more and more serious. Taking heavy metals as an example, heavy metal ions entering the environment are difficult to biodegrade, but they are easily enriched by biotransformation. Long-term exposure or use of such heavy metal polluted water bodies will bring serious dangers to surrounding residents and the ecological environment. Long-term use of chromium-containing water can cause kidney failure, skin cancer and lung damage, and long-term exposure to lead-polluted environments can cause serious damage to the human hematopoietic system and nervous system.

In recent years, heavy metal repairing technology based on zero-valent iron, due to its low price and environmental friendliness, can achieve efficient separation and fixation of heavy metals, and is widely used in the repairing and treatment of heavy metal pollution in water. However, zero-valent iron often has defects such as passivation, agglomeration, and inactivation during use. The oxide layer formed by oxidation in the aqueous solution hinders the outward transmission of zero-valent iron electrons, resulting in the decrease of the activity of zero-valent iron. In response to this defect, the predecessors used measures such as pickling, ultrasound and magnetization to remove or alleviate the inhibitory effect of the oxide layer on the surface of zero-valent iron. However, the formation of such an oxide layer in an aqueous solution is unavoidable. In addition, the oxide layer plays an important role in the adsorption, complexation and surface precipitation of heavy metals in the process of removing heavy metals by zero-valent iron, and these processes are closely related to its surface functional groups. Therefore, changing the composition of the surface oxide layer of zero-valent iron and regulating its functional group type is one of the effective ways to strengthen the activity and selectivity of zero-valent iron in removing heavy metals.

At the same time, the use of zero-valent iron's strong electron-donating ability and the use of zero-valent iron to activate persulfate has become a very promising technology in the treatment of refractory organic pollutant wastewater. This technology can produce sulfate radicals that are stronger than hydroxyl radicals, and it has a longer life and a certain selectivity. The heterogeneous activation technology based on zero-valent iron can alleviate the problems of uncontrollable reaction rate, rapid hydrolysis and precipitation of iron ions, introduction of anions that can quench free radicals and secondary pollution caused by iron sludge in homogeneous ferrous system.

However, based on the activation technology of zero-valent iron, there is still an oxide layer formed on the surface of zero-valent iron after oxidation to inhibit the continuous release of ferrous iron from zero-valent iron, which leads to a decrease in the catalytic activity of the system. In order to solve this problem, researchers have used zero-valent iron to support bimetal to construct a galvanic effect to promote the corrosion and dissolution of zero-valent iron and improve the catalytic activity of zero-valent iron. In addition, by changing the surface properties of zero-valent iron, such as surface sulfidation of zero-valent iron, regulating the corrosion behavior of zero-valent iron and the release rate of ferrous iron, the activation efficiency of zero-valent iron catalytic materials can also be enhanced. Neither synthetic zero-valent iron with bimetallic load nor surface sulfur-modified zero-valent iron can avoid the secondary pollution caused by the dissolution of toxic metals or sulfur elements in the reaction process. Therefore, exploring green and efficient technology to improve the oxidation activity of zero-valent iron activated persulfate has always been a problem to be solved.

TECHNICAL FIELD

The invention belongs to the technical field of environmental material preparation and polluted water bodies repairing, and specifically relates to a silicified modified zero-valent iron.

The invention also relates to a method for preparing the above-mentioned silicified modified zero-valent iron.

The invention also relates to the application of the above-mentioned silicified modified zero-valent iron in repairing polluted water bodies.

BRIEF SUMMARY

The purpose of the invention is to provide a silicified modified zero-valent iron.

Another purpose of the invention is to provide a method for preparing the above-mentioned silicified modified zero-valent iron.

In order to achieve the above objectives, the silicified modified zero-valent iron provided by the present invention has a silicon-containing oxide layer formed by silicate on its surface, which is obtained by the following method: dissolved silicate and micron iron powder are used as raw materials and mixed in proportion, and ball milling under an inert gas atmosphere to obtain the silicified modified zero-valent iron;

The dissolved silicate is one or more of sodium silicate, potassium metasilicate, layered crystalline sodium disilicate, and layered crystalline potassium disilicate; The ratio of dissolved silicate to micron iron powder is 0.02-20% based on the molar ratio of silicon/iron.

The preparation method for preparing the above-mentioned silicified modified zero-valent iron provided by the present invention is:

dissolved silicate and micron iron powder are used as raw materials and mixed in proportion, and ball milling under an inert gas atmosphere to obtain the silicified modified zero-valent iron;

The dissolved silicate is one or more of sodium silicate, potassium metasilicate, layered crystalline sodium disilicate, and layered crystalline potassium disilicate;

The ratio of dissolved silicate to micron iron powder is 0.02-20% based on the molar ratio of silicon/iron.

In the preparation method, the iron powder is micron-sized reduced iron powder, pig iron powder and/or foamed iron powder, and the particle size of the iron powder is 100-800 mesh.

In the preparation method, the ball milling speed is 300-900 r/min, and the ball milling time is 2-20 h.

The application of the silicified modified zero-valent iron of the present invention in repairing polluted water bodies.

In the application, the polluted water bodies includes water bodies polluted by a variety of heavy metals and organic wastewater polluted by organic matter, the heavy metals include chromium, arsenic, lead and nickel, and the organic wastewater includes but not limited to organic polluted water bodies containing chlorinated organic substances, antibiotics and polycyclic aromatic hydrocarbons.

In the application, the measures to repair heavy metal polluted water bodies are based on ground multi-stage mixing-separation equipment, in-situ high pressure injection and permeable reaction wall.

In the application, the repairing of organic wastewater uses silicified modified zero-valent iron as catalytic activator and persulfate as oxidant for organic wastewater treatment, and the molar ratio of the catalytic activator to the oxidant is 1:0.5-3, preferred 1:1.5-2.1.

In the application, the persulfate is one or more of potassium peroxymonosulfate, sodium peroxymonosulfate, ammonium peroxymonosulfate, potassium peroxydisulfate, sodium peroxydisulfate, and ammonium peroxydisulfate.

In the application, the pH value of the organic wastewater treatment system is controlled within 3-10.

Compared with the prior art, the present invention has the following beneficial effects:

The silicon source used in the present invention is green, non-toxic, low in cost, and does not have the problem of secondary pollution in the repairing process.

The method of the invention has simple process and convenient operation, can realize large-scale production and preparation, and has good separation and fixation performance for various heavy metal ions. Due to the coordination effect of the special silanol group of the silicide shell, the Fe(III) produced by oxidation can accept electron and be reduced at the interface, realizing the continuous supply of Fe(II), and realizing the efficient treatment of a variety of refractory organic wastewater.

DETAILED DESCRIPTION

The technical principle of the present invention will be further described below in conjunction with the accompanying drawings and embodiments.

Embodiment 1

Figure 1:
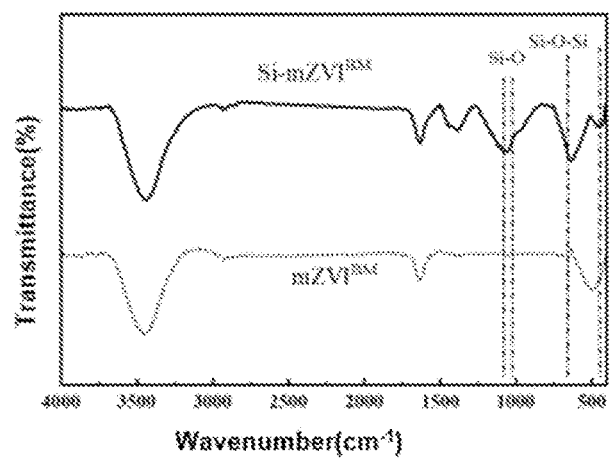
FIG. 1 is the Fourier transform infrared spectrum characteristics of the silicified modified zero-valent iron of the present invention and the ordinary unsilicified zero-valent iron.
Figure 2:
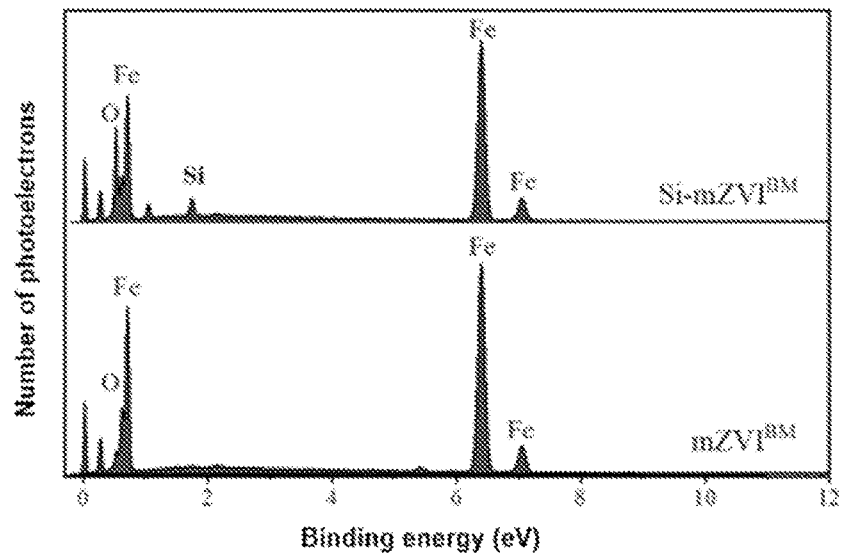
FIG. 2 is the SEM-EDS Mapping of the silicified modified zero-valent iron of the present invention and the ordinary unsilicified zero-valent iron.
Figure 3:
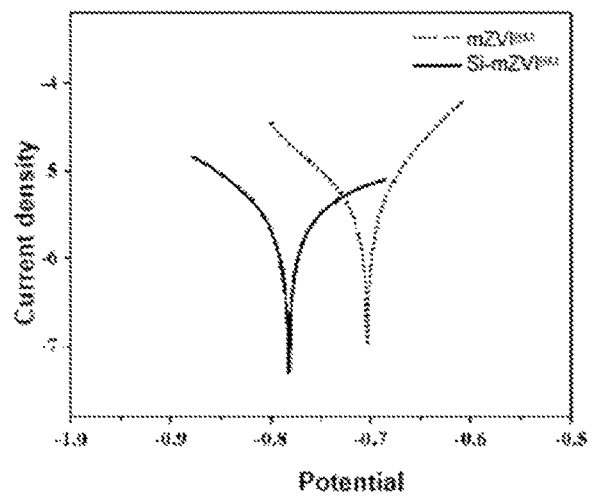
FIG. 3 is the Tafel diagram of the silicified modified zero-valent iron of the present invention and the ordinary unsilicified zero-valent iron.

Micron zero-valent iron has low activity to remove heavy metals, and it is easy to form a hydroxyl-rich surface passivation layer, which is not conducive to the adsorption of heavy metals and sustained electron release, resulting in serious loss of activity during repair. The present invention selects environment-friendly soluble silicate (an inorganic component in the background of natural water) as the surface modification regulator of zero-valent iron. Through repeated grinding in the ball milling process, the zero-valent iron oxide layer is broken to form a new silicified oxide layer, and in this process, the particle size of the zero-valent iron is reduced and the specific surface area is increased, and the reduction activity of the zero-valent iron is improved. According to the Fourier transform infrared spectrum characteristics (FIG. 1), compared with the unsilicified ball-milled zero-valent iron ($mZVI^{BM}$), the silicified modified zero-valent iron ($Si-mZVI^{BM}$) appears an asymmetric stretching peak representing Si—O, and a Si—O—Si in-plane stretching vibration peak, indicating that the silicate reacts with the hydroxyl on the surface of the iron, and the silicate coordinates with the zero-valent iron surface to form a silicified oxide layer, which is further confirmed that $Si-mZVI^{BM}$ sample has significant abundance of silicon based on the element distribution energy spectrum (FIG. 2). The silicified layer on the surface of the zero-valent iron after silicidation can inhibit the agglomeration of the sample, strengthen the selective adsorption of heavy metal ions, and promote the electron-supply ability of the zero-valent iron (FIG. 3).

Take 5 grams of reduced micron iron powder and 0.16 grams of layered sodium disilicate, mix them and place them in a ball mill tank, ball mill for 4 hours in an argon atmosphere, the ball mill speed is 500 rpm/min, wash and dry.

Take 100 mL of simulated hexavalent chromium polluted water with a concentration of 2.5 g/L as the model pollutant, add 0.2 g of above-prepared iron silicide sample ($Si-mZVI^{BM}$) to it, under constant temperature conditions, rotating at 200 rpm/min shaker reaction, after regular sampling. Cr(VI) were determined via the 1,10-phenanthroline colorimetric and 1,5-diphenylcarbazide methods using an UV-visible spectrophotometer.

Figure 4:
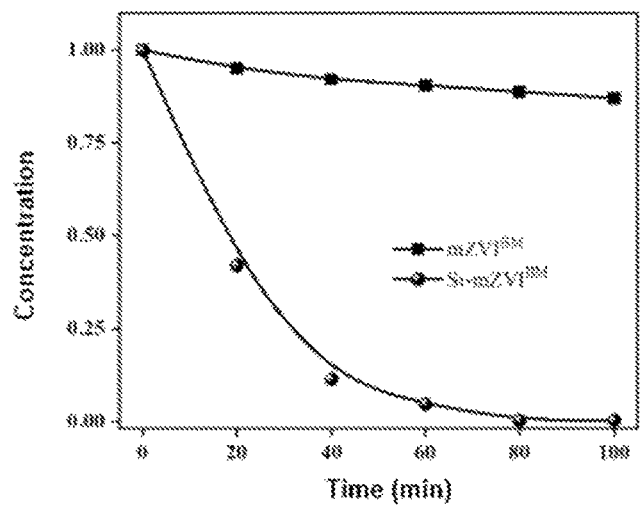
FIG. 4 is the effect diagram of treating hexavalent chromium polluted water body with silicified modified zero-valent iron according to the present invention.

At the same time, the unsilicified ball milled iron ($mZVI^{BM}$) in the same ball milling method was used as a control, the results are shown in FIG. 4. After 100 minutes of reaction, the removal rate of hexavalent chromium in the silicified modified zero-valent iron system treated by silicidation ball milling reached 100%, while the removal rate of hexavalent chromium in the unsilicified iron system was less than 10%.

Embodiment 2

Take 10 grams of reduced micron iron powder, add 0, 0.165, 0.33, 0.66, 1, 1.3 grams of sodium silicate respectively and mix them in a ball mill tank, and ball mill under argon atmosphere for 5 hours, the ball mill speed is 550 rpm/min, wash and dry, marked as $mZVI^{BM}$, 1 #$mZVI^{BM}$, 2 #$mZVI^{BM}$, 3 #$mZVI^{BM}$, 4 #$mZVI^{BM}$ and 5 #$mZVI^{BM}$ respectively.

Figure 5:
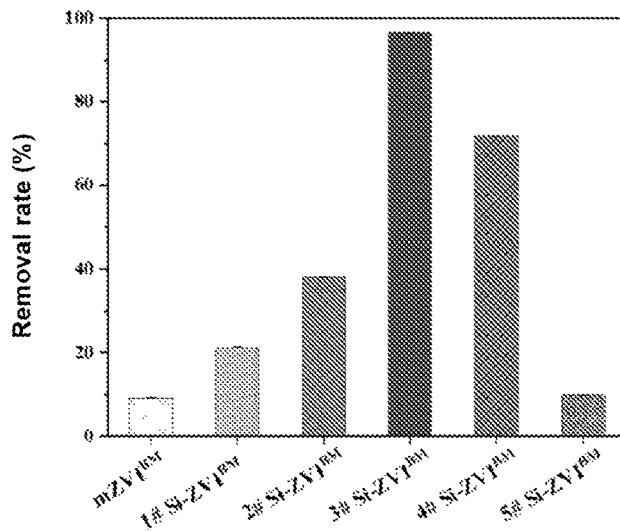
FIG. 5 is the effect diagram of treating hexavalent chromium polluted water with zero-valent iron with different degrees of silicidation modification in Embodiment 2 of the present invention.

Take 100 mL of simulated hexavalent chromium polluted water with a concentration of 2 g/L as the restoration object, add 0.2 g of above-prepared iron silicide sample ($Si-mZVI^{BM}$) to it, under constant temperature conditions, rotating at 200 rpm/min shaker reaction, after regular sampling, use a spectrophotometer to determine the content of hexavalent chromium, the results are shown in FIG. 5. After 60 minutes of reaction, the removal rate of hexavalent chromium by 3 #mZVI$^{BM}$ reached 97%, followed by the removal rate of hexavalent chromium by 4 #mZVI$^{BM}$ reached 72%, the removal rate of hexavalent chromium by all silicified zero-valent iron was stronger than that of unsilicified mZVI$^{BM}$.

Embodiment 3

In this embodiment, silicified modified zero-valent iron is used as a catalytic activator, and persulfate is used as an oxidant to treat organic wastewater. The key feature of silicified modified zero-valent iron is that its surface and interface are rich in silanol groups.

Take 10 grams of reduced micron iron powder and 0.64 grams of layered sodium disilicate, mix them and place them in a ball mill tank, ball mill for 4 hours in an argon atmosphere, the ball mill speed is 550 rpm/min, at the same time, use the same ball milling method to prepare unsilicified ball milled iron (mZVI$^{BM}$) as a control, wash and dry. X-ray photoelectron spectroscopy and infrared spectroscopy were performed on the chemical composition of the two surfaces (see FIG. 6 and FIG. 7), the Si-mZVI$^{BM}$ surface interface has a significant content of silicon.

Figure 6:
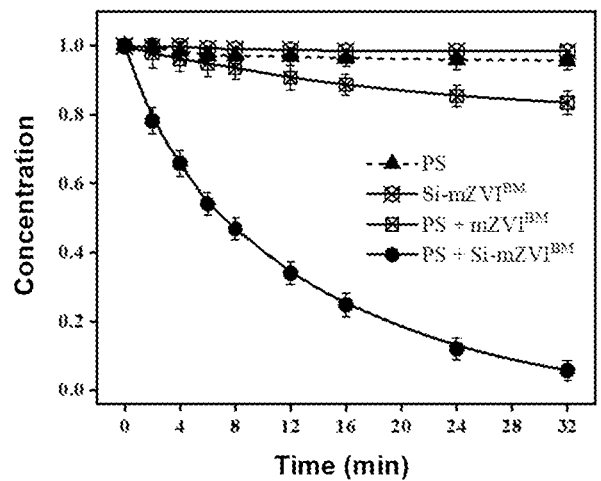
FIG. 6 shows the performance comparison of sulfamethazine treated by the silicified micron zero-valent iron in Embodiment 3 of the present invention and the ordinary unsilicified ball milled iron.

Taking 100 mL of the water contaminated by a simulated antibiotic (sulfamethazine) with a concentration of 10 mg/L as the restoration object, add 0.02 grams of the ball milled iron prepared above and 1.5 mM sodium persulfate to it. Under the constant temperature condition, and shaker reaction with rotating speed of 200 rpm/min, after regular sampling, the content of sulfamethazine is determined by high performance liquid chromatography, and the result is shown in FIG. 6. After 32 minutes of reaction, the removal rate of sulfamethazine in the zero-valent iron system treated by silicified ball milling reached 100%, and the removal rate of hexavalent chromium in the unsilicified ball milled iron system was less than 20%, while the removal of single persulfate and iron silicate is very small.

Embodiment 4

Take 10 g of reduced micron iron powder, add 0, 0.16, 0.33, 0.66, 1, 2.6 g of sodium silicate respectively, mix them and place in a ball mill tank, ball mill in a vacuum environment for 5 hours, the ball mill speed is 550 rpm/min, wash and dry, marked as mZVI$^{BM}$, 1 #Si-mZVI$^{BM}$, 2 #Si-mZVI$^{BM}$, 3 #Si-mZVI$^{BM}$, 4 #Si-mZVI$^{BM}$ and 5 #Si-mZVI$^{BM}$ respectively.

Figure 7:
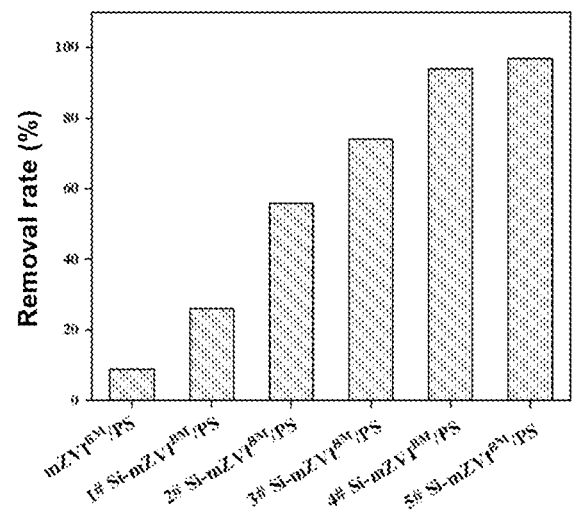
FIG. 7 compares the performance of treating dichlorophenol with persulfate activated by different silicified micron zero-valent iron in Embodiment 4 of the present invention.

Taking 100 mL of simulated dichlorophenol-contaminated water with a concentration of 10 mg/L as the restoration object, add 0.03 g of the ball milled iron sample prepared above and 2 mM potassium persulfate to it, under constant temperature conditions, and shaker reaction with rotating speed of 200 rpm/min, after regular sampling, the high-performance liquid chromatography was used to determine the content of dichlorophenol, the results are shown in FIG. 7. After 60 minutes of reaction, the removal rate of dichlorophenol by 4 #Si-mZVI$^{BM}$ and 5 #Si-mZVI$^{BM}$ reached 95%, and the removal efficiency of dichlorophenol by 2 #Si-MZVI$^{BM}$ and 3 #Si-MZVI$^{BM}$ activated persulfate was lower than 5 #Si-mZVI$^{BM}$, and the removal of dichlorophenol by all activated persulfate systems with silicified zero-valent iron was stronger than that by mZVI$^{BM}$ with unsilicified ball-milled iron.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preparing a silicified zero-valent iron, comprising:
    mixing a silicate and micron-sized iron powder in proportion to form a mixture; and
    ball milling the mixture under an inert gas atmosphere to obtain the silicified zero-valent iron comprising a surface layer of a silicon containing oxide;
    wherein the silicate comprises one of sodium silicate, potassium metasilicate, a layered crystalline sodium disilicate, a layered crystalline potassium disilicate, or a mixture of two or more thereof, and
    wherein a ratio of the silicate to the micron-sized iron powder is from 0.02 to 20% based on a molar ratio of silicon to iron.

2. The method of claim 1, wherein the micron-sized iron powder is one of reduced iron powder, pig iron powder, foamed iron powder, or a mixture of two or more thereof, and wherein a particle size of the micron-sized iron powder is from 100 to 800 mesh.

3. The method of claim 1, wherein the ball milling is performed at a speed from 300 to 900 r/min for a duration from 2 to 20 hours.

* * * * *